(12) United States Patent
Irfan et al.

(10) Patent No.: US 7,028,296 B2
(45) Date of Patent: Apr. 11, 2006

(54) DISTRIBUTING COMPUTER PROGRAMS TO A CUSTOMER'S MULTIPLE CLIENT COMPUTERS THROUGH A HYPERTEXT MARKUP LANGUAGE DOCUMENT DISTRIBUTED TO AND STORED ON THE CUSTOMER'S NETWORK SERVER COMPUTER

(75) Inventors: Syed Babar Irfan, Austin, TX (US); William M. Lee, Cedar Park, TX (US); Dudley Burnham Miller, Round Rock, TX (US); Michael Alexander Moras, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 887 days.

(21) Appl. No.: 10/015,834

(22) Filed: Dec. 13, 2001

(65) Prior Publication Data
US 2003/0115287 A1 Jun. 19, 2003

(51) Int. Cl.
*G06F 9/445* (2006.01)
(52) U.S. Cl. ...................... 717/178; 717/171
(58) Field of Classification Search ............... 717/171, 717/178; 709/220, 221, 222, 250
See application file for complete search history.

(56) References Cited

U.S. PATENT DOCUMENTS

| 5,434,791 | A | * | 7/1995 | Koko et al. ................... 700/97 |
| 6,026,379 | A | * | 2/2000 | Haller et al. .................. 705/34 |
| 6,253,027 | B1 | * | 6/2001 | Weber et al. ................. 380/287 |
| 6,253,217 | B1 | * | 6/2001 | Dourish et al. ............. 715/500 |
| 6,301,707 | B1 | * | 10/2001 | Carroll et al. ............... 717/177 |
| 6,301,710 | B1 | * | 10/2001 | Fujiwara ..................... 717/175 |
| 6,389,592 | B1 | * | 5/2002 | Ayres et al. ................. 717/172 |
| 6,408,434 | B1 | * | 6/2002 | Fujiwara ..................... 717/170 |
| 6,513,045 | B1 | * | 1/2003 | Casey et al. ............. 707/104.1 |
| 6,539,372 | B1 | * | 3/2003 | Casey et al. .................... 707/3 |
| 6,546,554 | B1 | * | 4/2003 | Schmidt et al. ............. 717/176 |
| 6,560,769 | B1 | * | 5/2003 | Moore et al. ............... 717/100 |
| 6,694,508 | B1 | * | 2/2004 | Moore et al. ............... 717/121 |
| 6,701,517 | B1 | * | 3/2004 | Moore et al. ............... 717/121 |

OTHER PUBLICATIONS

CHIME:A Metadata-based Distributed Software Development Environment, Stephen E. Dossick et al, ACM SIGSOFT Engineering Notes, vol. 24, Issue 6, Oct. 1999, 12 pages.*
"Using Netscape 2", Mark R. Brown, published by Que, 1995, Chapter 37.*

* cited by examiner

*Primary Examiner*—Todd Ingberg
(74) *Attorney, Agent, or Firm*—J. B. Kraft; David A. Mims, Jr.

(57) ABSTRACT the transmission to and the storage in a customer server computer connected to a network of a plurality of client computers, a Hypertext Markup Language document that includes an embedded program applet for selectively accessing each of the application programs being distributed, and an embedded installation applet for accessing a program for installing the application programs being distributed on said client computers. When a user at one oF the client computers wishes to have one of the application programs installed, the user requests the document, preferably a Web page (i.e. an HTML implemented document), to be displayed, the user selects one of the application programs for installation by clicking on the displayed Web page hyperlink. In response to such a selection, the installation applet is sent to and stored on the client computer that selected said application program.

27 Claims, 5 Drawing Sheets

DISTRIBUTING COMPUTER PROGRAMS TO A CUSTOMER'S MULTIPLE CLIENT COMPUTERS THROUGH A HYPERTEXT MARKUP LANGUAGE DOCUMENT DISTRIBUTED TO AND STORED ON THE CUSTOMER'S NETWORK SERVER COMPUTER

TECHNICAL FIELD

The present invention relates to a system, method and program for the distribution of computer programs through computer networks and particularly object oriented network systems using Hypertext Markup Language (HTML) documents to a customer's local network of server computers and client computers in a manner that is expeditious and involves very little down time of the local network or its components.

BACKGROUND OF RELATED ART

The past decade has been marked by a technological revolution driven by the convergence of the data processing industry with the consumer electronics industry. The effect has driven technologies which have been known and available but relatively quiescent over the years. Two of these technologies are the Internet-related distribution and object oriented programming systems. Both of these technologies are embodied in the object oriented Java programming system. The computer and communications industries are extensively participating in the development and continual upgrading of the Java system. For details and background with respect to the Java system, reference may be made to a typical text, *Just Java*, 2nd Edition, Peter van der Linden, Sun Microsystems, 1997. The convergence of the electronic entertainment and consumer industries with data processing greatly accelerated the demand for wide ranging communications distribution channels and the World Wide Web (Web) or Internet (the terms are used interchangeably herein), which had quietly existed for over a generation as a loose academic and government data distribution facility, reached "critical mass" and commenced a period of phenomenal expansion that has not, as yet, abated.

With the expanded accessibility of tens of thousands of programmers to each other, not to mention to potential users of such programs via the expanded Internet client base, an obvious need became apparent: cooperative programming systems wherein program developers could coact to continuously expand and enhance existing programs in a distributed programming environment. Also, users could readily obtain and apply these developed programs. Object oriented programming, which also had been virtually languishing for a generation, offered the solution. With its potentially interchangeable objects or units within which both data attributes and functions were stored in a predefined uniform framework, as well as the predefined object interfaces with each other, object oriented programming systems have found acceptance as the programming system for the Internet. In all areas of data processing, communications as well as the electronic entertainment and consumer industries having anything to do with the Internet, there has been a substantial movement to Java, the Sun Microsystems originated object oriented programming system.

Despite all of these advances, there still remains great resistance in all industries and business fields to new computer programs and significant program upgrades that offer much in productivity increases. This resistance results from past experience that equates to installing new computer programs or significant program upgrades in existing systems with large amounts of down time, during which the customer's business, manufacturing facility or individual worker functions are inoperative or operate at diminished levels. When a business or production facility is trying to decide whether to install a new computer system, the concern about down time, the possible loss of business, as well as stress on the workers involved very often outweighs the cost of the installation in influencing the decision. The concern about business and production delays resulting from installation has become so significant that small business customers are reluctant to try to make program changes on their own.

The Web has been providing an extensive carrier for the distribution of all matter of data content, e.g. text, images, moving images (video recordings) and computer programs. However, thus far, it has not provided much help to the small business customers wishing to install new computer programs or making significant upgrades in such programs. Often the installation of computer programs transmitted over the Web will require even greater computer sophistication than direct installation of such programs because the customer is then required to have some additional knowledge of the Web and its protocols.

As the present invention involves the basic Web document or page, some background as to the structure of the Web document is appropriate. The basic Web document is formatted in a markup language, usually HTML. The Java documentation program, JavaDoc, will produce standard HTML files for outputs to computer controlled displays to provide standard natural language displays of the program documentation.

HTML is used there for all forms of display documentation including the markup of hypertext and hypermedia documents, usually stored with their respective documents on a Web server in addition to the above-described programming distribution. HTML is an application of SGML (Standard Generalized Markup Language), an ISO standard for defining the structure and contents of any digital document. It should be recognized that any of the aspects of the present invention illustrated with respect to HTML would be equally applicable to SGML. For further details on Java, JavaDoc or HTML, reference may be made to the texts *Just Java* (referenced above) or *Java in a Nutshell*, 2nd Edition, David Flanagan, O'Reilly publisher, 1997.

SUMMARY OF THE PRESENT INVENTION

The present invention offers a solution to the problems involved in the installation of new programs and program upgrades into the computers in small business customer networks through the use of a unique Web page implementation. In the customer's computer controlled object oriented programming network system, the present invention involves the transmission to and the storage in a customer server computer connected to the network of a plurality of client computers, a HTML document that includes embedded program applets for selectively accessing each of the application programs being distributed, and an embedded installation applet for accessing a program for installing the application programs being distributed on said client computers. When a user at one of the client computers wishes to have one of the application programs installed, the user requests the document, preferably a Web page, i.e. an HTML implemented document to be displayed, the user selects one of the application programs for installation by clicking on a displayed Web page link to select the application program. In response to such a selection, there are means for sending and storing the installation applet to the client computer which selected said application program. However, the selected application program is sent to this client computer only after said installation applet is stored in said client computer.

It should be noted that the installation applet, which in turn will access the installation program, may have already been sent to the client computer and stored therein at the time that the client computer requested the Web page.

Likewise, the installation applet may have already been stored on the client computer in connection with the installation of a previously selected program. Thus, the installation applet is sent only if an installation applet has not been previously sent to said client computer.

BRIEF DESCRIPTION OF THE DRAWINGS

The present invention will be better understood and its numerous objects and advantages will become more apparent to those skilled in the art by reference to the following drawings, in conjunction with the accompanying specification, in which.

DETAILED DESCRIPTION OF THE PREFERRED EMBODIMENT

Figure 1:
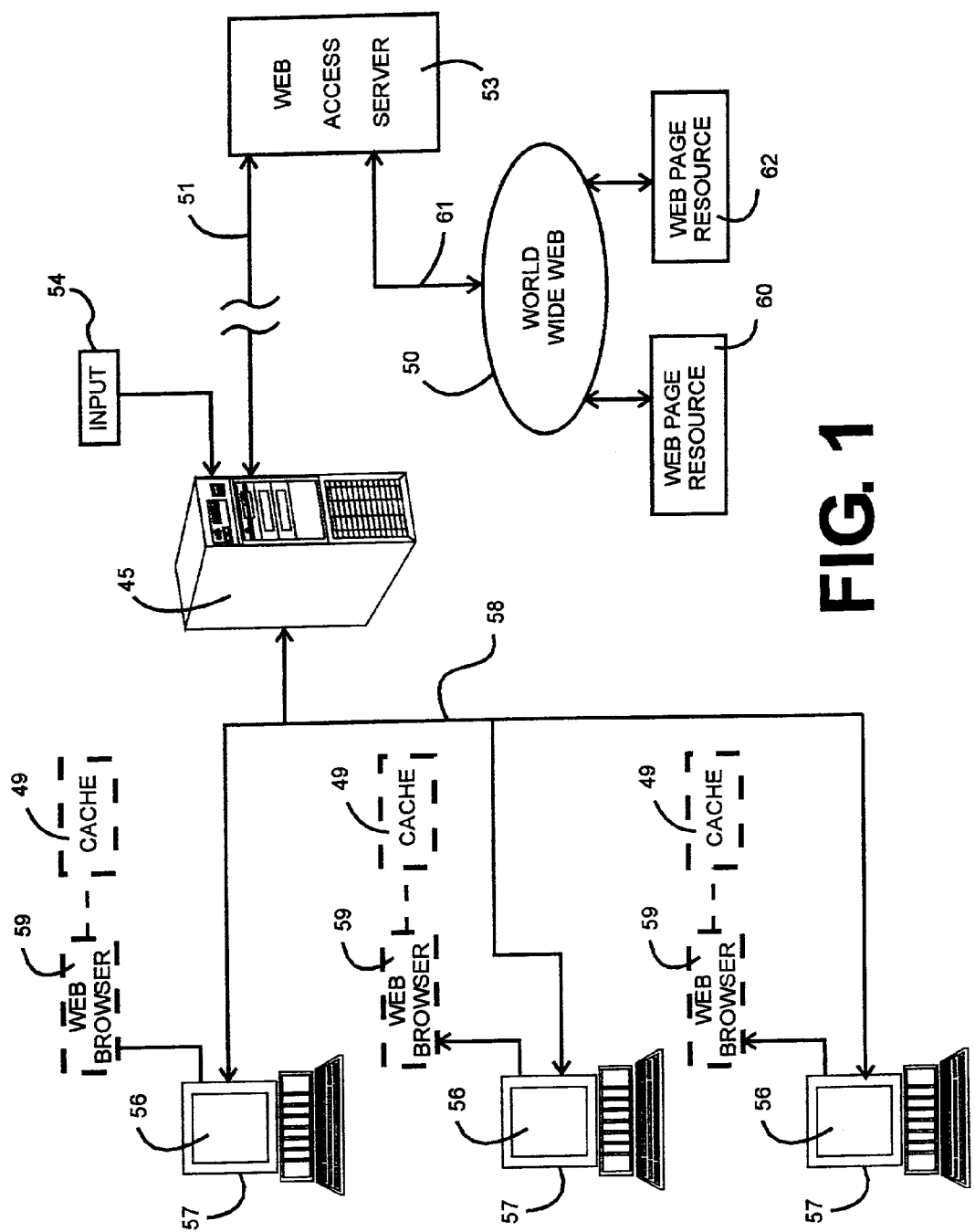
FIG. 1 is a generalized diagrammatic view of a network, such as a local customer network, of a server computer connected to a Web portion on which the present invention may be implemented.

Referring to FIG. 1, there is shown a very generalized diagram of a Web portion on which the present invention may be implemented. In the examples which follow, we will use the Web as the computer controlled object oriented programming network system. Actually, the present invention may be implemented on any appropriate network for handling object oriented program systems. The customer network on which the application programs are to be selectively installed is illustrated by server computer 45 having an appropriate I/O 54 and connected to and serving the set of customers client computers 57, each having a user interactive display interface 56, controlled by a conventional Web browser program 59 and an associated cache 49. Customer server 45 is typically connected to the Web 50 via standard Web wired connections through Web server 53, which may be provided by a commercial service provider via connections 61. Reference may be made to the text, *Mastering the Internet*, G. H. Cady et al., published by Sybex Inc., Alameda, Calif. 1996, particularly pp. 136–147, for typical connections between local display stations to the Web 50 via access server 53 through connection 51.

The HTML Web pages used to transmit the program access applets and program installation applets, according to the present invention, may originate at Web page resource sites 60 or 62 and be transmitted over the Web to customer server 45 on which the Web page or document is stored until the customer client computers select the application programs for installation, or the Web documents may be input for storage in server 45 through I/O 54 by any other convenient expedient. In any event, the Web documents remain stored on server 45 until one of the client computers 57 accesses and displays the interactive Web document as will be subsequently described with respect to FIG. 3.

Before going further into the details of specific embodiments, it will be helpful to understand from a more general perspective the various elements and methods that may be related to the present invention. Since a major aspect of the present invention is directed to Web documents, such as Web pages, transmitted over networks, an understanding of networks and their operating principles would be helpful. We will not go into great detail in describing the networks to which the present invention is applicable. Reference has also been made to the applicability of the present invention to a global network, such as the Internet or Web. For details on Internet nodes, objects and links, reference is again made to the text, *Mastering the Internet*.

The Internet or Web is a global network of a heterogeneous mix of computer technologies and operating systems. Objects are linked to other objects in the hierarchy through a variety of network server computers. These network servers are the key to network distribution, such as the distribution of Web pages and related documentation. In this connection, the term "documents" is used to describe data transmitted over the Web or other networks and is intended to include Web pages with displayable text, graphics and other images. This displayable information may be still, in motion or animated, e.g. animated GIF images.

Web documents are conventionally implemented in HTML language, which is described in detail in the above-referenced text entitled *Just Java*, particularly at Chapter 7, pp. 249–268, dealing with the handling of Web pages; and also in the aforementioned text *Mastering the Internet*, particularly at pp. 637–642, on HTML in the formation of Web pages. The images on the Web pages are implemented in a variety of image or graphic files, such as MPEG, JPEG or GIF files, which are described in the text: *Internet: The Complete Reference, Millenium Edition*, Young et al., 1999, Osborne/McGraw-Hill, particularly at pp. 728–730.

In addition, aspects of this invention will involve Web browsers. A general and comprehensive description of browsers may be found in the above-mentioned *Mastering the Internet* text at pp. 291–313. More detailed browser descriptions may be found in the *Internet: The Complete Reference, Millennium Edition* text mentioned above: Chapter 19, pp. 419–454, on the Netscape Navigator; Chapter 20, pp. 455–494, on the Microsoft Internet Explorer; and Chapter 21, pp. 495–512, covering Lynx, Opera and other browsers.

The present invention is implemented using the Java Programming system, which is an object oriented system utilizing the Java programming language. The Java system and language are extensively familiar to those skilled in the art. The text *Just Java*, that was described above, comprehensively details the system and language. Nonetheless, it should be helpful to generally review the known principles of object oriented programming. It should be understood by those skilled in the art that object oriented programming techniques involve the definition, creation, use and instruction of "objects". These are software entities comprising data elements or attributes and methods that manipulate the data elements. The data and related methods are treated by the software as an entity and can be created, used and deleted as such. The data and functions enable objects to model their real world equivalent entity in terms of its attributes, which can be presented by the data elements, and its behavior, which can be represented by its methods.

Figure 2:
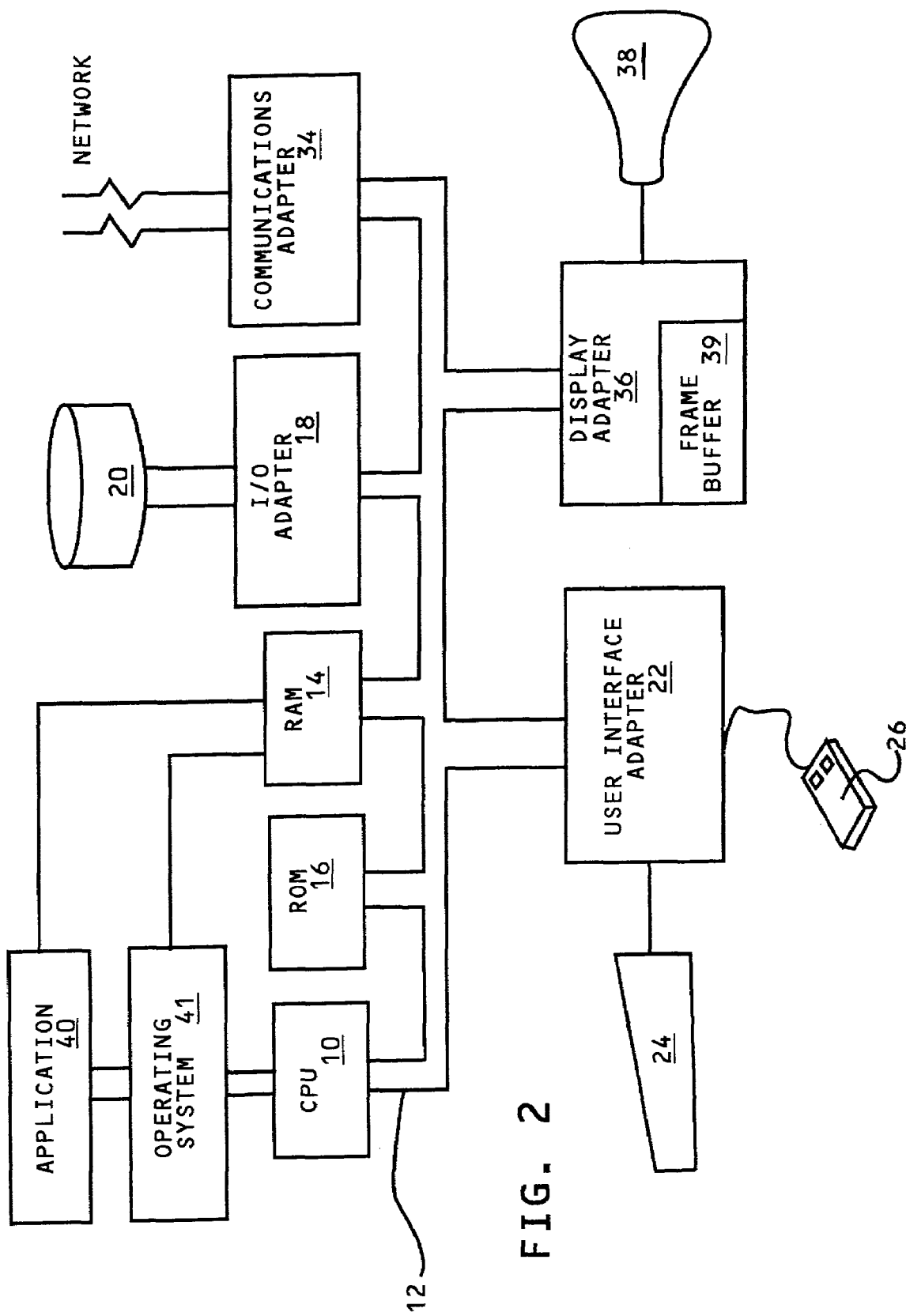
FIG. 2 is a block diagram of a data processing system including a central processing unit and network connections via a communications adapter that is capable of functioning both as a customer server computer and the customer's client computers.

Referring to FIG. 2, a typical data processing unit is shown that may function as the client computers used for receiving the Web pages or function as the customer server computers 59 (FIG. 1). A central processing unit (CPU) 10, such as one of the PC microprocessors or workstations, e.g. eServer pSeries available from International Business Machines Corporation (IBM) or Dell PC microprocessors, is provided and interconnected to various other components by system bus 12. An operating system 41 runs on CPU 10, provides control and is used to coordinate the function of the various components of the computer of FIG. 2. Operating system 41 may be one of the commercially available operating systems such as IBM's AIX or Microsoft's WindowsMe™ or Windows 2000™, as well as UNIX and other IBM AIX operating systems. Application programs 40, controlled by the system, are moved into and out of the main memory Random Access Memory (RAM) 14. These programs include the object oriented control programs of the present invention for the distribution of application programs from customer server computers to the client computers of FIG. 1 through the use of a Web page with embedded program applets for accessing the application programs and for installing the application program on requesting client computers. These functions will be described hereinafter in combination with conventional Web browsers (browsers 49, FIG. 1) at client computers, such as Netscape 4.76™ or Microsoft's Internet Explorer™. A Read Only Memory (ROM) 16 is connected to CPU 10 via bus 12 and includes the Basic Input/Output System (BIOS) that controls the basic computer functions. RAM 14, I/O adapter 18 and communications adapter 34 are also interconnected to system bus 12. I/O adapter 18 may be a Small Computer System Interface (SCSI) adapter that communicates with the disk storage device 20. The Web browser cache (cache 49, FIG. 1) may be set up on disk storage 20. Communications adapter 34 interconnects bus 12 with an outside network. In the customer server, this could be the Web. I/O devices are also connected to system bus 12 via user interface adapter 22 and display adapter 36. Keyboard 24 and mouse 26 are all interconnected to bus 12 through user interface adapter 22. It is through such input devices that the user at the client computers may interactively relate to the Web page programs for accessing the application programs and for installing the application program on requesting client computers according to the present invention.

Display adapter 36 includes a frame buffer 39, which is a storage device that holds a representation of each pixel on the display screen 38. Images may be stored in frame buffer 39 for display on monitor 38 through various components, such as a digital to analog converter (not shown) and the like. By using the aforementioned I/O devices, a user is capable of inputting information to the system through the keyboard 24 or mouse 26 and receiving output information from the system via display 38.

Figure 3:
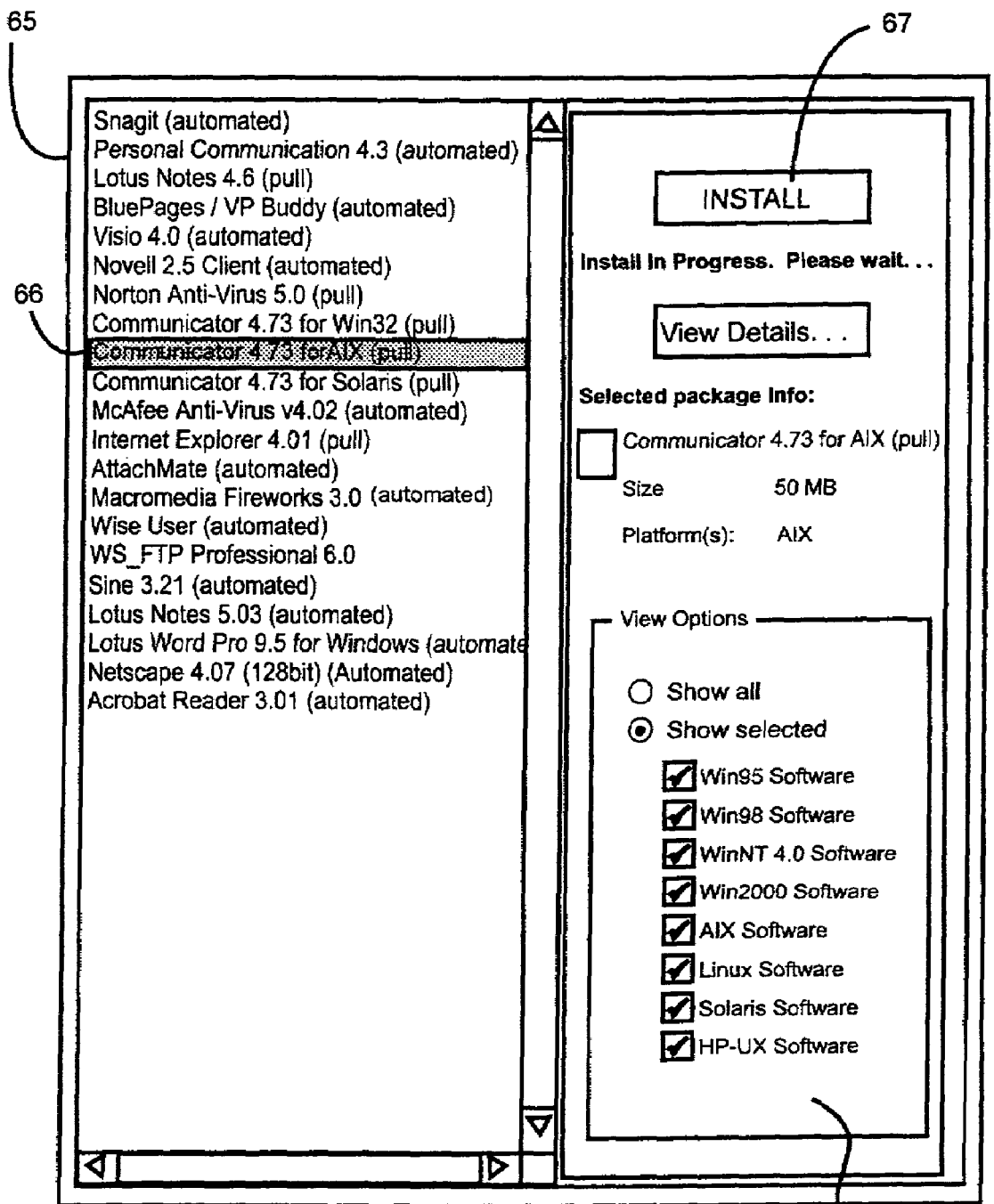
FIG. 3 is an illustrative interactive display showing an illustrative Web page with hyperlinks to the program accessing applet, as well as to the installation applet.

Now, with respect to FIG. 3, we will provide an illustrative example of how the present invention may be used to interactively relate to the Web page programs for accessing the application programs and for installing the application program on requesting client computers according to the present invention. FIG. 3 shows a typical Web page or document used by a requesting user at the interactive display 56 of a client computer 57 to install application programs stored on customer server computer 45 (FIG. 1). The Web page shown in FIG. 3 carries applets including a program for accessing user selected application programs from the customer server computer and for installing such accessed application programs on the client computer. When the client accesses the Web page of FIG. 3, the applet program for installing the selected application program is automatically stored in the cache 49 associated with the browser 59 of the requesting client 57 (FIG. 1), unless the program for installing has previously been so stored in the cache. Then, when the user makes a selection 66 (FIG. 3) from the menu 65 of application programs available from the customer server computer and presses the install button 67, the applet program for accessing the selected application program gets the application from customer server 45 and the installation program automatically installs the application program on the client computer. List 64 on the Web page lists the software systems with which the accessing and installation functions are compatible.

Figure 4:
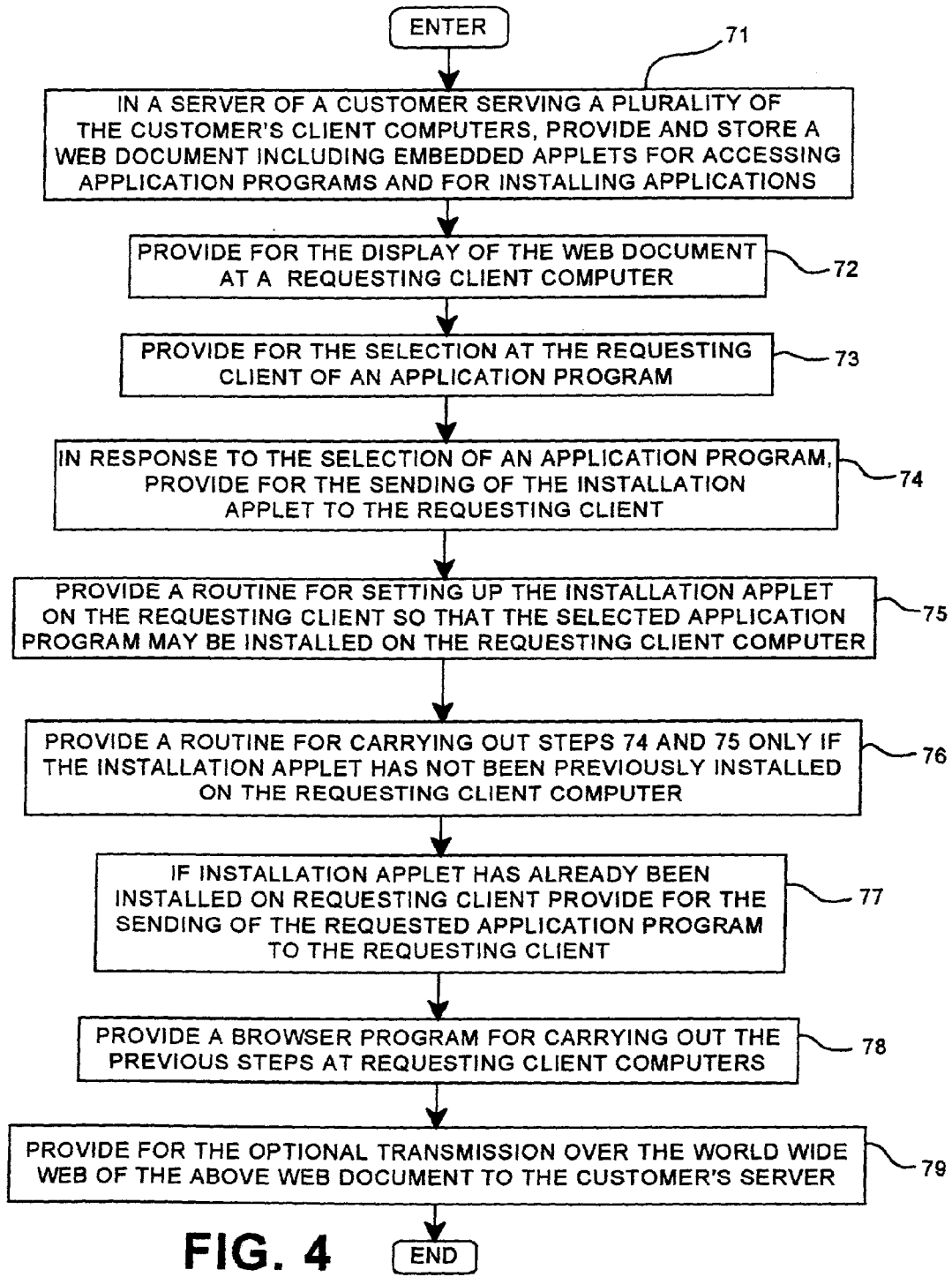
FIG. 4 is an illustrative flowchart describing the setting up of the elements of the present invention for storing on a customer server a Web page containing the application program applets to be installed and the installation applets.

FIG. 4 is a flowchart showing the development of a process according to the present invention for the distribution of application programs from customer server computers to the client computers. In the customer's server that serves a plurality of the customers' computers, there is provided and stored a Web document including embedded applets for accessing application programs and applets for installing applications. These applets may be separate or combined into a single program applet, step 71. There is provided at each of the client computers the ability to request and display the Web page, step 72. This may be done under the control of the Web browser at the client. The client is enabled to select an application program from a menu of application programs on the Web page, step 73. When the application program is selected, step 74, the installation applet of the Web page must be at the requesting client. As previously described, this may be provided by storing the installation program applet on the browser cache when the user at the client requests the Web page. At that point, the applet may be immediately sent, unless the installation applet has already been obtained, step 76, e.g. in connection with a previous installation. In any event, a routine is set up at the client for setting up the applet so that the requested application program may be automatically installed when received, step 75. There is then provided a routine for sending from the server to the client the requested application program for installation, step 77. As previously mentioned, a Web browser, step 78, may be provided for carrying out the previous steps. It should be noted that the Web page itself may be sent to the customer server from a source over the Web, step 79.

Figure 5:
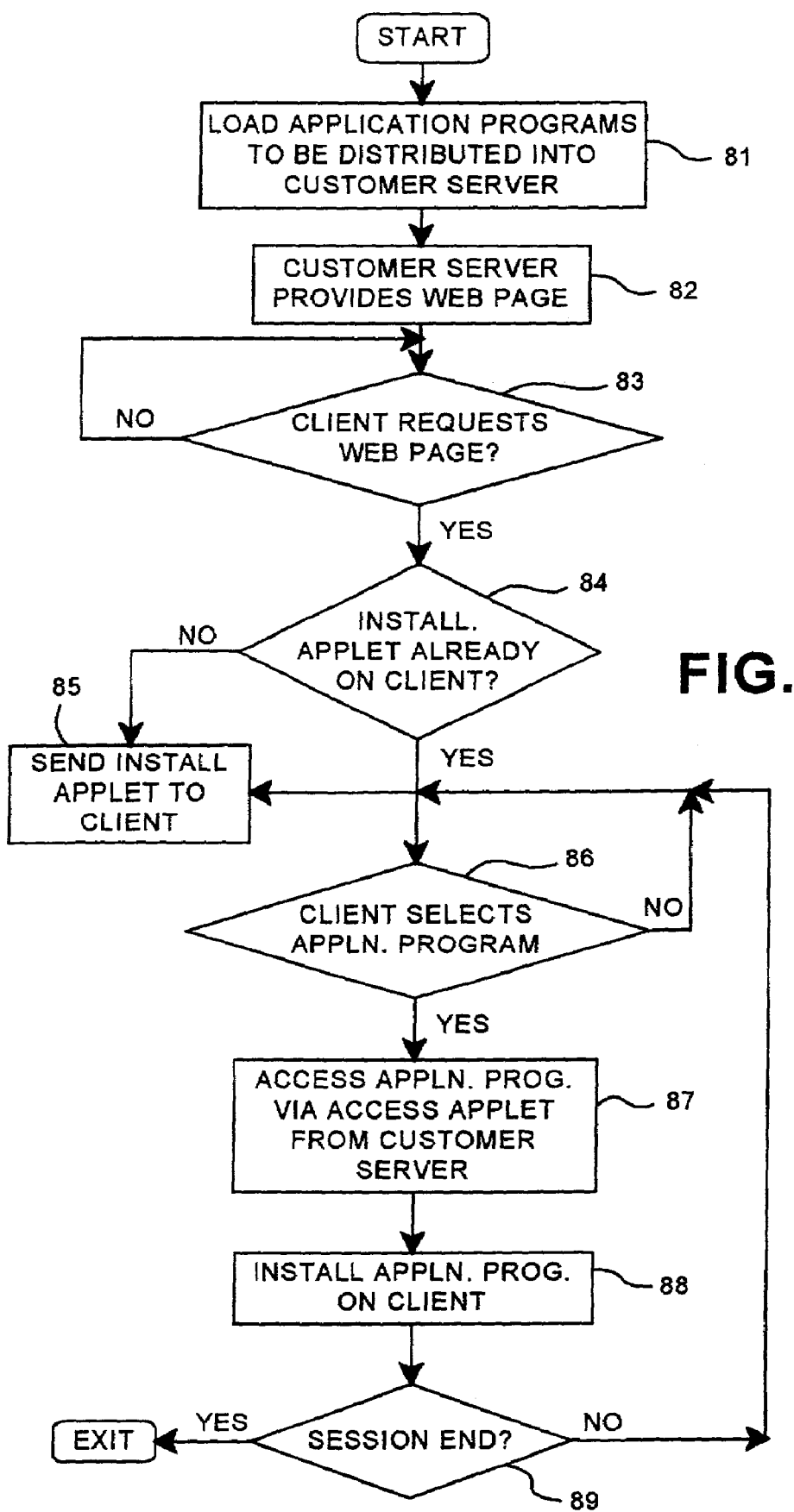
FIG. 5 is a flowchart of an illustrative run of the program set up in FIG. 4.

The running of the process set up in FIG. 4 will now be described with respect to the flowchart of FIG. 5. The applications to be distributed are loaded into and stored in the customer server computer, step 81. The Web page to be provided to a requesting client is also set up in the customer server, step 82. A determination is made as to whether a client computer has requested the stored Web page, step 83. If Yes, a further determination is made as to whether the installation applet has already been loaded into the client browser cache, step 84. If No, the installation applet is stored at the requesting client as described above, step 85. Then, or if the determination in step 84 is Yes, a further determination is made as to whether the user at the client computer has selected an application program, step 86. If No, the selection is awaited. If Yes, then the selected application program is accessed from the customer server by the program access applet, step 87, and the application program is installed on the client computer automatically through the installation program, step 88. At this point, a determination may conveniently be made as to whether the session is over, step 89. If Yes, the session is exited. If No, the session is returned to step 86 where the selection of another application program is awaited.

One of the preferred implementations of the present invention is in application program 40, i.e. a browser program made up of programming steps or instructions resident in RAM 14, FIG. 1, of a Web receiving station and/or Web server during various Web operations. Until required by the computer system, the program instructions may be stored in another readable medium, e.g. in disk drive 20 or in a removable memory, such as an optical disk for use in a CD ROM computer input or in a floppy disk for use in a floppy disk drive computer input. Further, the program instructions may be stored in the memory of another computer prior to use in the system of the present invention and transmitted over a Local Area Network (LAN) or a Wide Area Network (WAN), such as the Web itself, when required by the user of the present invention.

One skilled in the art should appreciate that the processes controlling the present invention are capable of being distributed in the form of computer readable media of a variety of forms. Although certain preferred embodiments have been shown and described, it will be understood that many changes and modifications may be made therein without departing from the scope and intent of the appended claims.

What is claimed is:

1. A computer controlled object oriented programming network system for distributing selected application programs from a provider to a plurality of a customer's client computers comprising:
   a customer server computer connected to said plurality of client computers;
   means associated with said server computer for storing a Hypertext Markup Language document including:
      an embedded program applet for selectively accessing each of said application programs being distributed, and
      an embedded installation applet for accessing a program for installing said application programs being distributed on said client computers;
   means associated with at least one of said client computers for selecting one of said application programs for installation; and
   means responsive to said selection of said application program for sending said installation program to the client computer that selected said application program.

2. The computer controlled network system of claim 1 wherein said Hypertext Markup Language document is a World Wide Web document.

3. The computer controlled network system of claim 2 further including means for transmitting said World Wide Web document to said customer server computer over the World Wide Web.

4. The computer controlled network system of claim 2 further including means for sending at least one selected application program to the client computer that selected said program.

5. The computer controlled network system of claim 4 further including:
   means in said client computer for storing said installation applet; and
   wherein said means for sending said at least one selected application program to said client computer sends said application program after said installation applet is stored in said client computer so that said installation applet may access said installation program.

6. In a computer controlled object oriented programming network system, a method for distributing selected application programs from a provider to a plurality of a customers' client computers comprising:
   storing in a customer server computer connected to said plurality of client computers, a Hypertext Markup Language document including:
      an embedded program applet for selectively accessing each of said application programs being distributed, and
      an embedded installation applet for accessing a program for installing said programs being distributed of said client computers;
   selecting at one of said client computers, one of said application programs for installation; and
   responsive to said selection of said application program, sending said installation program to the client computer that selected said application program.

7. The method of claim 6 wherein said Hypertext Markup Language document is a World Wide Web document.

8. The computer controlled network system of claim 7 further including the step of transmitting said World Wide Web document to said customer server computer over the World Wide Web.

9. The method of claim 7 further including the step of sending at least one selected application program to the client computer that selected said application program.

10. The method of claim 9 further including:
    the step of storing said installation applet in said client computer; and
    wherein said step of sending said at least one selected application program to said client computer sends said application program after said installation applet is stored in said client computer.

11. A computer program having code recorded on a computer readable medium for distributing selected application programs from a provider to a plurality of a customers' client computers in a computer controlled object oriented programming network system, said computer program comprising:
    a customer server; means associated with a server computer connected to a plurality of client computers for storing a Hypertext Markup Language document including:
       an embedded program applet for selectively accessing each of the application programs being distributed, and
       an embedded installation applet for accessing a program for installing said client computers;
    and means for sending said selected application program to the client computer that selected said application program after said installation applet is stored in said client computer so that said installation applet may access said client computer so that said installation applet may access said installation program means associated with at least one of said client computers for selecting one of said application programs for installation; and means responsive to said selection of said application program for sending installation program to the client computer that selected said application program.

12. The computer program of claim 11 wherein said Hypertext Markup Language document is a World Wide Web document.

13. The computer program of claim 12 further including means for transmitting said World Wide Web document to said customer server computer over the World Wide Web.

14. The computer program of claim 12 further including means for sending at least one selected application program to the client computer that selected said application program.

15. The computer program of claim 14 further including:
means in said client computer for storing said installation applet; and
wherein said means for sending said at least one selected application program to said client computer sends said program after said installation applet is stored in said client computer so that said installation applet may access said installation program.

16. A Hypertext Markup Language document for distribution of computer application programs on a computer readable medium to client computers over the World Wide Web comprising; an embedded object oriented program applet, each applet for selectively accessing application programs being distributed;
and means for sending said selected application program to the client computer that selected said application program after said installation applet is stored in said client computer so that said installation applet may access said client computer so that said installation applet may access said installation program,
an embedded installation applet for accessing a program for installing said application programs; and user selectable hyperlinks to one of said embedded applets.

17. The Hypertext Markup Language document of claim 16 further includeing a user selectable install hyperlink to automatically install in client computers, the application programs accessed by said embedded program applets.

18. The Hypertext Markup Language document of claim 17 wherein said embedded object oriented program applets and installation applets are implemented in the Java object oriented programming language.

19. A computer controlled object oriented programming network system for distributing selected application programs from a provider to a plurality of a customer's client computers comprising:
a customer server computer connected to said plurality of client computers;
means associated with said server computer for storing A World Wide Web document including:
an embedded program applet for selectively accessing each of said application programs being distributed, and
an embedded installation applet for accessing a program for installing said application programs being distributed on said client computers;
means associated with at least one of said client computers for selecting one of said application programs for installation;
means responsive to said selection of said application program for sending said installation program to the client computer that selected said application program;
means in said client computer for storing said installation applet only if said installation applet has not been previously stored in said client computer; and
means for sending said selected application program to the client computer that selected said application program after said installation applet is stored in said client computer so that said installation applet may access said installation program.

20. The computer controlled network system of claim 19 wherein said client computers further include a user interactive World Wide Web browser, said World Wide Web browser including:
said means associated with a client computer for selecting one of said application programs for installation; and
means controlling said storing of said installation applet only if said installation applet has not been previously stored in said client computer.

21. The computer controlled network system of claim 20 further including means associated with said World Wide Web browser for caching the stored installation applet.

22. In a computer controlled object oriented programming network system, a method for distributing selected application programs from a provider to a plurality of a customers' client computers comprising:
storing in a customer server computer connected to said plurality of client computers, a World Wide Web document including:
an embedded program applet for selectively accessing each of said application programs being distributed, and
an embedded installation applet for accessing a program for installing said programs being distributed on said client computers;
selecting at one of said client computers, one of said application programs for installation;
responsive to said selection of said application program, sending said installation program to the client computer that selected said application program;
storing said application applet in said client computer only if said installation applet has not been previously stored in said client computer; and
sending said selected application program to the client computer that selected said application program after said installation applet is stored in said client computer so that said installation applet may access said installation program.

23. The method of claim 22 further including user interactive World Wide Web browser programs, said World Wide Web browser programs including the steps of:
selecting at one of said client computers, one of said application programs for installation; and
controlling said storing of said installation applet only if said installation applet has not been previously stored in said client computer.

24. The method of claim 23 wherein said World Wide Web browser includes the steps of caching the stored installation applet.

25. A computer program having code recorded on a computer readable medium for distributing selected application programs from a provider to a plurality of a customer's client computers in a computer controlled object oriented programing network system, said computer program comprising:
a customer server computer;

means associated with a server computer connected to a plurality of client computers for storing a World Wide Web document including:
- an embedded program applet for selectively accessing each of the application program being distributed, and
- an embedded installation applet for accessing a program for installing said application programs being distributed on said client computers;

means associated with at least one of said client computers for selecting one of said application programs for installation;

means responsive to said selection of said application program for sending said installation program to the client computer that selected said application program;

means in said client computer for storing said installation applet only if said installation applet has not been previously stored in said client computer; and means for sending said selected application program to the client computer that selected said application program after said installation applet is stored in said client computer so that said installation applet may access said installation program.

26. The computer program of claim 25 wherein said client computers further include a user interactive World Wide Web browser program, said World Wide Web browser program including:
- said means associated with a client computer for selecting one of said application programs for installation; and
- said means controlling said storing of said installation applet only if said installation applet has not been previously stored in said client computer.

27. The computer program of claim 26 further including means associated with said World Wide Web browser program for caching the stored installation applets.

* * * * *

UNITED STATES PATENT AND TRADEMARK OFFICE
CERTIFICATE OF CORRECTION

PATENT NO. : 7,028,296 B2 Page 1 of 1
APPLICATION NO. : 10/015834
DATED : April 11, 2006
INVENTOR(S) : Syed Babar Irfan et al.

It is certified that error appears in the above-identified patent and that said Letters Patent is hereby corrected as shown below:

Title page,
Item [57], ABSTRACT, line 1, delete "the", first occurance; and insert -- The --.
line 8, delete "oF" and insert --of--.

Column 9,
Line 41, delete "includeing" and insert --including--.
Line 54, delete "A" and insert --a--.

Column 10,
Line 41, delete "application" and insert --installation--.
Line 64, delete "customer's" and insert --customers'--.
Line 65, delete "programing" and insert --programming--.

Signed and Sealed this

Seventeenth Day of October, 2006

JON W. DUDAS
*Director of the United States Patent and Trademark Office*